(12) United States Patent
Skoniecki et al.

(10) Patent No.: US 11,571,992 B2
(45) Date of Patent: Feb. 7, 2023

(54) ADJUSTABLE MOTOR VEHICLE SEAT

(71) Applicant: Faurecia Autositze GmbH, Stadthagen (DE)

(72) Inventors: Artur Skoniecki, Warsaw (PL); Grzegorz Lasak, Grojec (PL); Dariusz Radecki, Grojec (PL)

(73) Assignee: FAURECIA AUTOSITZE GMBH, Stadthagen (DE)

( * ) Notice: Subject to any disclaimer, the term of this patent is extended or adjusted under 35 U.S.C. 154(b) by 0 days.

(21) Appl. No.: 17/371,992

(22) Filed: Jul. 9, 2021

(65) Prior Publication Data
US 2022/0017001 A1    Jan. 20, 2022

(30) Foreign Application Priority Data

Jul. 14, 2020    (DE) .................. 10 2020 118 582.0

(51) Int. Cl.
| | | |
|---|---|---|
| *B60N 2/30* | (2006.01) | |
| *B60N 2/04* | (2006.01) | |
| *B60N 2/12* | (2006.01) | |
| *B60N 2/20* | (2006.01) | |

(52) U.S. Cl.
CPC ................ *B60N 2/12* (2013.01); *B60N 2/20* (2013.01)

(58) Field of Classification Search
CPC ................................. B60N 2/12; B60N 2/146
See application file for complete search history.

(56) References Cited

U.S. PATENT DOCUMENTS

| | | | | |
|---|---|---|---|---|
| 4,615,551 A * | 10/1986 | Kinaga | ..................... | B60N 2/12 74/577 M |
| 5,106,144 A * | 4/1992 | Hayakawa | ........... | B60N 2/0818 296/68.1 |
| 5,288,105 A * | 2/1994 | Ikegaya | .............. | B60R 22/1953 297/480 |
| 5,941,498 A * | 8/1999 | Hoshihara | .............. | B60N 2/146 296/68.1 |
| 7,488,026 B1* | 2/2009 | Jovicevic | ................. | B60N 2/16 296/65.13 |
| 7,575,281 B2* | 8/2009 | Jeong | ................... | B60N 2/2354 297/378.12 |
| 9,290,116 B2* | 3/2016 | Teufel | ...................... | B60N 2/12 |

(Continued)

FOREIGN PATENT DOCUMENTS

| | | |
|---|---|---|
| DE | 102015217696 | 1/2017 |
| DE | 102016204645 | 6/2017 |
| DE | 112011102736 | 5/2019 |

OTHER PUBLICATIONS

German Search Report dated Mar. 18, 2021 with respect to counterpart German patent application 10 2020 118 582.0.

(Continued)

*Primary Examiner* — Shin H Kim
(74) *Attorney, Agent, or Firm* — Henry M. Feiereisen LLC

(57) ABSTRACT

A motor vehicle seat adjustable from an entry position to a use position or vice versa includes first, second and third structural components which are movable relative to each other, and a locking device configured to impede a movement of the second structural component relative to the third structural component, when the first structural element is unlocked by a movement relative to the second structural component.

6 Claims, 9 Drawing Sheets

(56) References Cited

U.S. PATENT DOCUMENTS

| | | | |
|---|---|---|---|
| 2002/0195857 A1* | 12/2002 | Ito | B60N 2/12 |
| | | | 297/344.1 |
| 2008/0084073 A1* | 4/2008 | Willing | E05C 3/24 |
| | | | 292/14 |
| 2010/0084903 A1* | 4/2010 | Kammerer | B60N 2/01583 |
| | | | 297/331 |
| 2013/0320736 A1* | 12/2013 | Teufel | B60N 2/3013 |
| | | | 297/383 |
| 2015/0306978 A1* | 10/2015 | Watanabe | B60N 2/6009 |
| | | | 297/452.48 |
| 2021/0046891 A1* | 2/2021 | Tanabe | B60N 2/58 |
| 2021/0291702 A1* | 9/2021 | Takeda | B60N 2/06 |
| 2021/0402904 A1* | 12/2021 | Sera | B60N 2/305 |
| 2022/0080860 A1* | 3/2022 | Kupietz | B60R 16/0207 |

OTHER PUBLICATIONS

Translation of German Search Report dated Mar. 18, 2021 with respect to counterpart German patent application 10 2020 118 582.0.

* cited by examiner

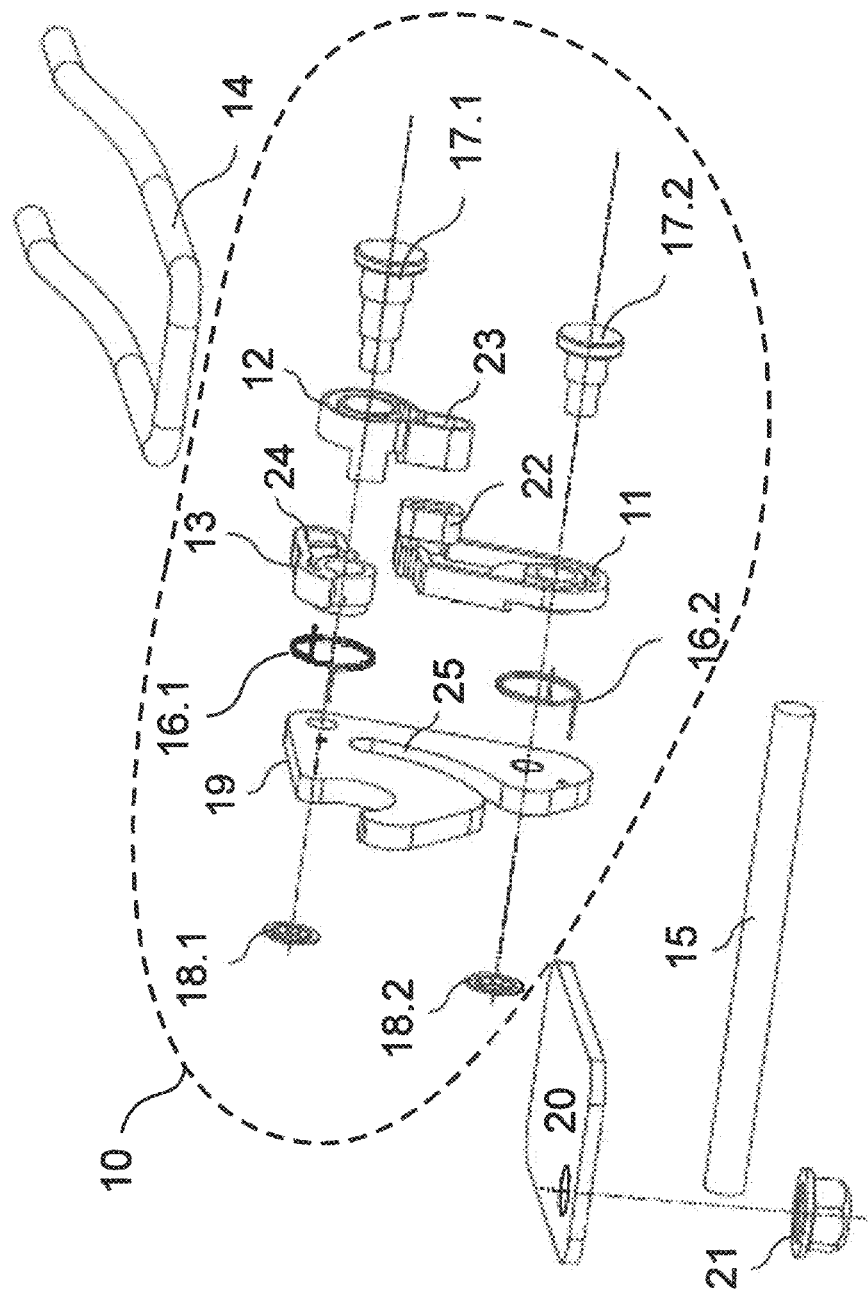

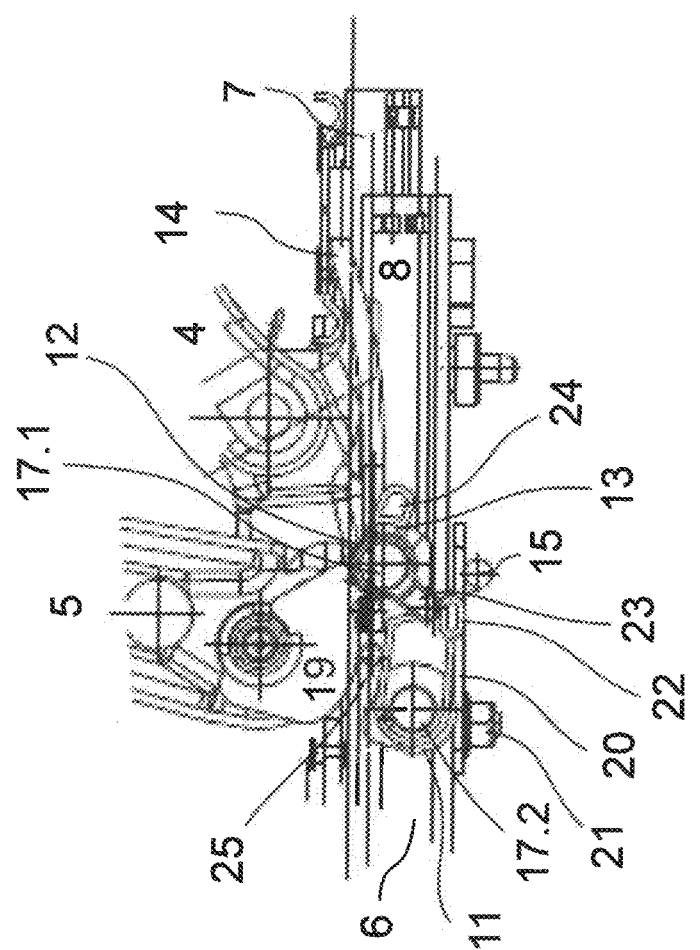
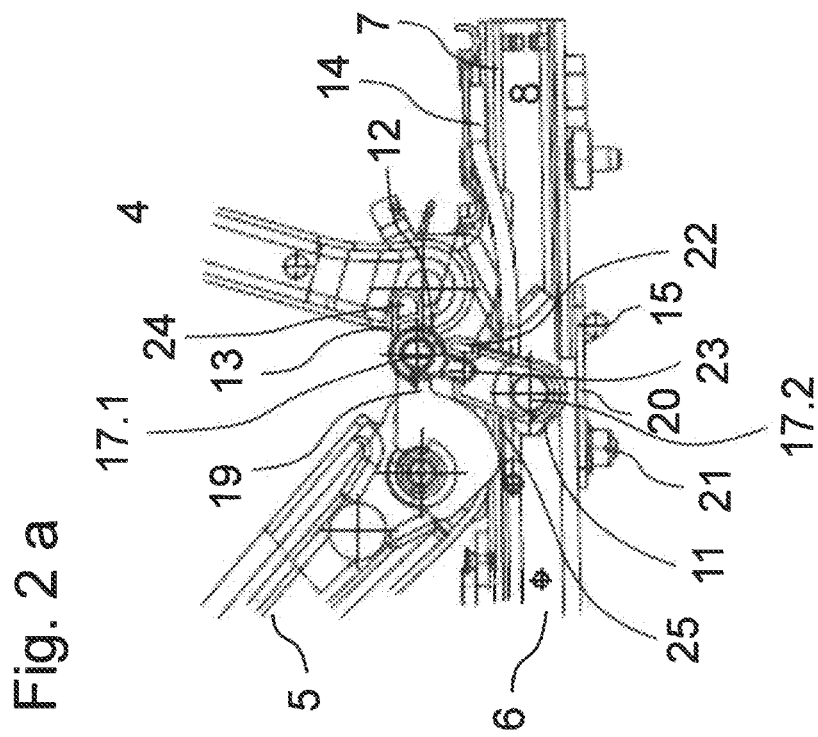

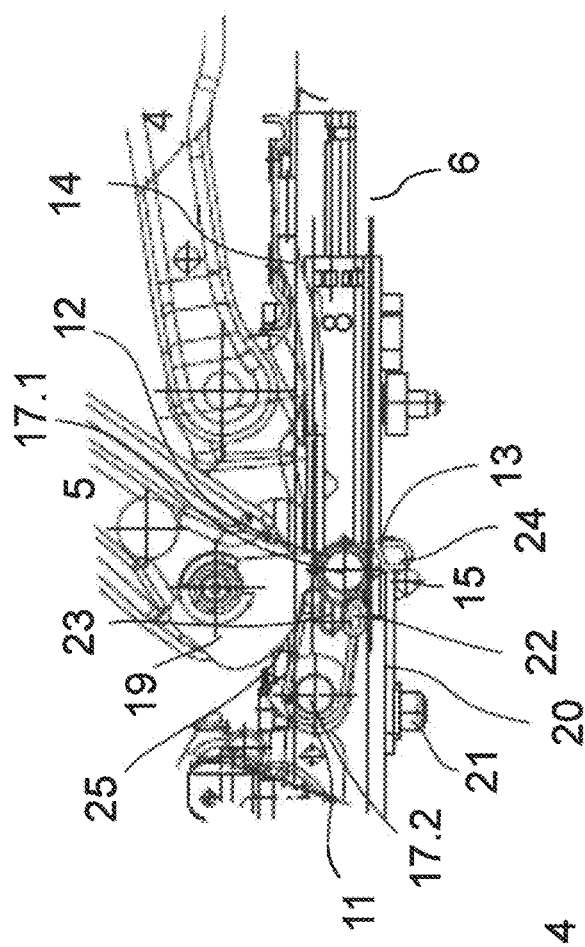
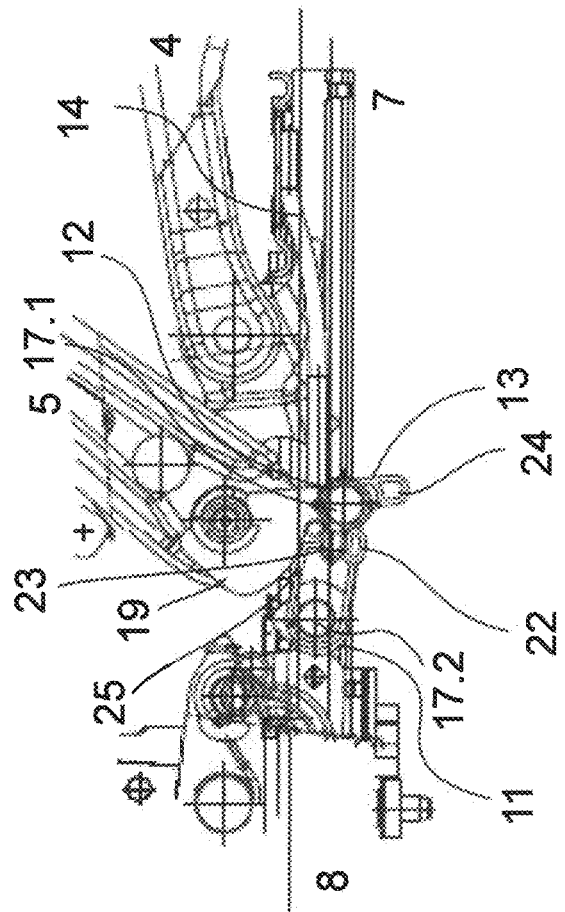
Fig. 3 b
Fig. 3 a

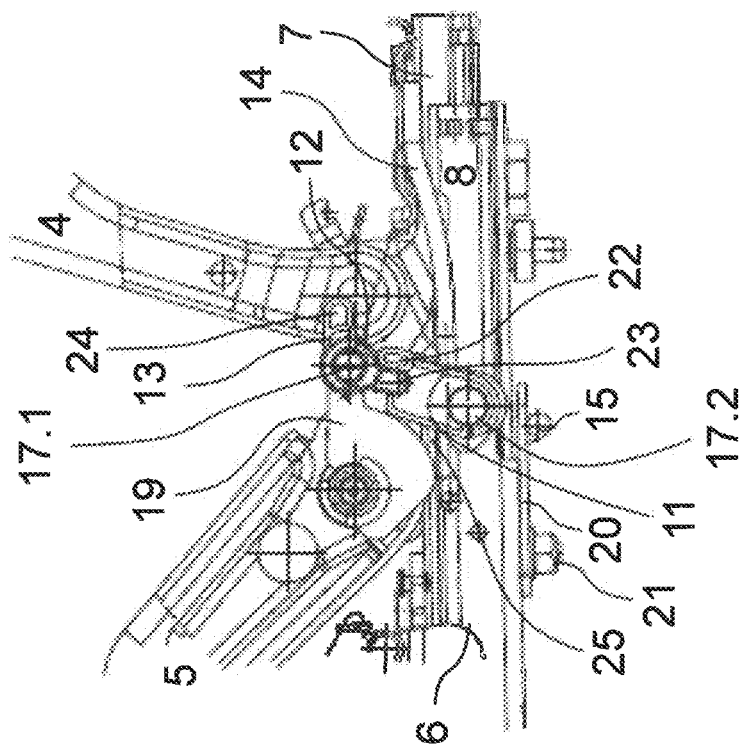
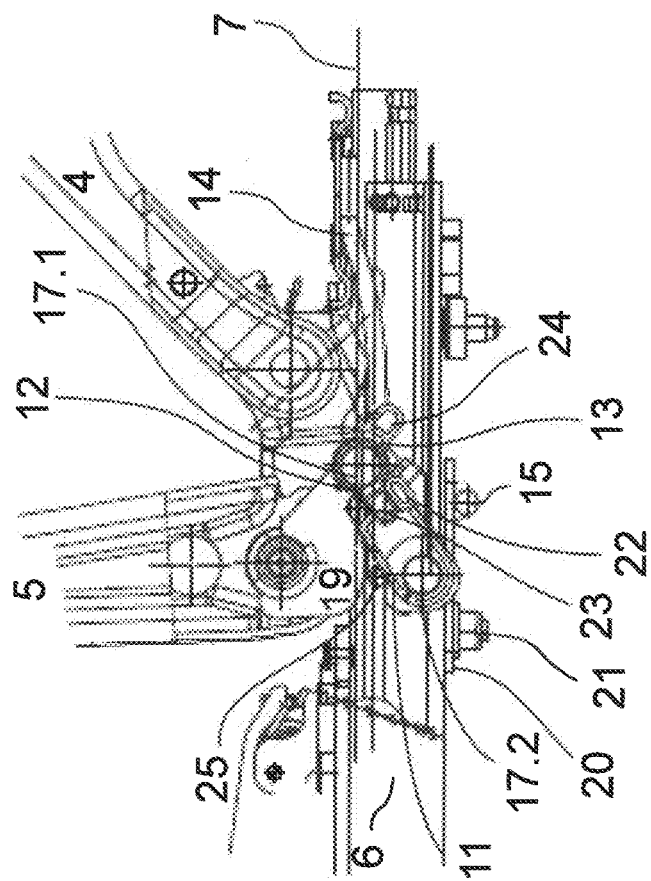

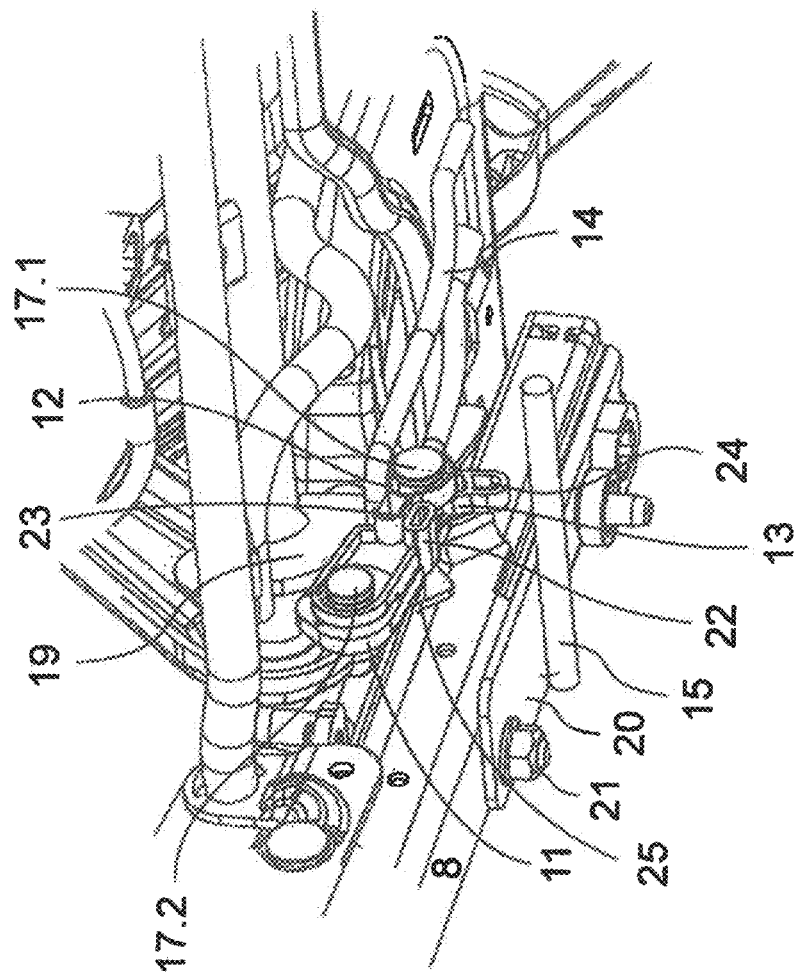
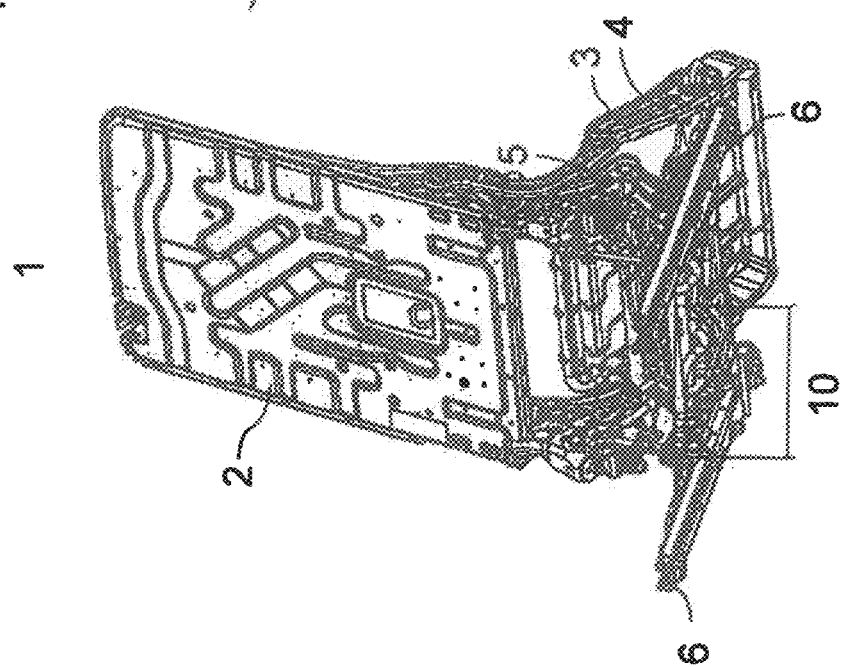
Fig. 5a
Fig. 5

ADJUSTABLE MOTOR VEHICLE SEAT

CROSS-REFERENCES TO RELATED APPLICATIONS

This application claims the priority of German Patent Application, Serial No. 10 2020 118 582.0, filed Jul. 14, 2020, pursuant to 35 U.S.C. 119(a)-(d), the disclosure of which is incorporated herein by reference in its entirety as if fully set forth herein.

BACKGROUND OF THE INVENTION

The invention relates to an adjustable motor vehicle seat.

The following discussion of related art is provided to assist the reader in understanding the advantages of the invention, and is not to be construed as an admission that this related art is prior art to this invention.

Motor vehicle seats, in particular front seats for two-door motor vehicles, typically have a backrest that is designed to fold forward to enable or simplify the entry of passengers or the placement of objects in the rear row of seats. By folding the backrest forward, the vehicle seat can be shifted forward into an unlocking position, known as an easy-entry function, by the longitudinal adjustment of the motor vehicle seat, which usually has an upper rail and a lower rail. When the backrest is folded back, the motor vehicle seat is moved again into a position that enables the entry of a passenger into the motor vehicle seat and a longitudinal adjustment when the motor vehicle seat is occupied.

It would be desirable and advantageous to provide an improved motor vehicle seat to obviate prior art shortcomings.

SUMMARY OF THE INVENTION

According to one aspect of the present invention, a motor vehicle seat adjustable from an entry position to a use position or vice versa includes a lower rail, subsequently also referred to as first structural component, an upper rail, subsequently also referred to as second structural component, and a guide rocker, subsequently also referred to as third structural component, which are movable relative to each other, and a locking device configured to impede a movement of the second structural component relative to the third structural component, when the first structural element is unlocked by a movement relative to the second structural component.

The adjustment from an entry position to a use position or from a use position to an entry position can be realized via a longitudinal movement as a force is exerted in the longitudinal direction. To adjust the motor vehicle seat from the entry position (easy-entry position) to the use position and vice versa, three structural components of the motor vehicle seat are designed to move relative to each other. The locking device can be configured to impede a movement between a backrest and a seat frame of the motor vehicle seat and can be unlocked by the longitudinal movement. This ensures that the backrest remains in the forward-inclined easy-entry position as long as the seat is still in a forward position. Only when the seat is pushed back is the movement between the backrest and the seat frame unblocked again.

To ensure clarity, it is necessary to establish the definition of several important terms and expressions that will be used throughout this disclosure.

The term "structural component" relates to any component that forms part of a supporting structure of the motor vehicle seat. Examples of a structural component include backrest frame, seat frame, upper and lower rails of a longitudinal seat adjuster for adjustment of the motor vehicle seat in a longitudinal direction, as well as guide rods connecting these components, e.g. guide rods to connect the upper rail to the seat frame.

The term "entry position" of the motor vehicle seat relates to a position of the motor vehicle seat in which an entry of a user into the row of seats behind the motor vehicle seat is possible (easy-entry position), i.e. the motor vehicle seat is shifted forward.

The term "use position" relates to a position in which a user can occupy the motor vehicle seat and adjust it in the longitudinal direction via the longitudinal seat adjuster.

According to another advantageous feature of the invention, the motor vehicle seat can be constructed to transition manually from the entry position to the use position, or vice versa. The motor vehicle seat according to the invention therefore requires no additional components such as an electric motor which would increase weight and costs of the motor vehicle seat. The locking device can be configured to lock the motor vehicle seat in the entry position such that the motor vehicle seat can only be transitioned to the use position again after an unlocking mechanism is actuated. Entering the rear row of seats is then comfortably and safely possible.

According to another advantageous feature of the invention, the locking device can include a locking element. The locking element can lock a structural component of the motor vehicle seat in the easy-entry position such that the motor vehicle seat can be transitioned to the use position only after an unlocking mechanism is actuated.

According to another advantageous feature of the invention, provision can be made for an unlocking element for releasing the locking device. The unlocking element can be arranged movably in relation to the locking device. This can be achieved by arranging the unlocking element on a different structural component than the locking element. The unlocking element therefore remains movable in relation to the locking element even in a locked state. Advantageously, the unlocking element may be arranged on a structural component, the movement of which is not impeded by the locking of the locking device.

According to another advantageous feature of the invention, the unlocking element can be arranged such that it can be mechanically brought into engagement with the locking element. The locking device is therefore unlocked by the mechanical engagement of the unlocking element in the locking element of the locking device.

According to another advantageous feature of the invention, the unlocking element can be mechanically brought into engagement with the locking element of the locking device by a relative movement of the first structural component relative to the second structural component. The locking device can therefore be unlocked by the relative movement of the first structural component relative to the second structural component. As a result of the relative movement between the first and second structural components of the motor vehicle seat, the unlocking element can be mechanically brought into engagement with the locking element of the locking device.

According to another advantageous feature of the invention, provision can be made for a longitudinal seat adjuster which includes an upper rail to define the second component, with the locking device including a hook configured to include a groove, and a retaining element mounted to the lower rail of the longitudinal seat adjuster and guided in the groove of the hook. Movement of the retaining element in the groove can in this way be easily impeded by a blocker.

According to another advantageous feature of the invention, the longitudinal seat adjuster can include a lower rail to define the first component, with the unlocking element being arranged on the lower rail of the longitudinal seat adjuster and interacting with the retaining element. As a result, the unlocking element can be brought into engagement with the retaining element and release the locking action through the longitudinal movement of the motor vehicle seat without the user needing to actuate an additional operating element.

According to another aspect of the invention, a method for adjusting a motor vehicle seat from an entry position to a use position or vice versa includes allowing first, second and third structural components of the motor vehicle seat to move relative to each other during adjustment from the entry position to the use position or vice versa, actuating a locking device for impeding a movement of the second structural component relative to the third structural component, and unlocking the locking device by moving the first structural component relative to the second structural component.

In accordance with the invention, the second and third structural components are advantageously impeded in their movement relative to each other until a position is reached by the movement of the first structural component relative to other structural components in which, for example, collisions between seat components are avoided or the easy-entry position is departed from again.

According to another advantageous feature of the invention an unlocking element of the first structural component can be engaged with an element of the locking device, when the first structural component moves relative to the second structural component. As a result, the unlocking can be realized without an additional actuation of an operating element by the user being necessary.

According to another advantageous feature of the invention, the element can be a deblocker which is engaged by the unlocking element, when the first structural component moves relative to the second structural component, and a movement of a locking element of the locking device is released by a movement of the deblocker.

According to another advantageous feature of the invention, the unlocking element can be mechanically brought into engagement with the locking element to unlock the locking device. The locking device is therefore unlocked by the mechanical engagement of the unlocking element in the locking element of the locking device.

According to another advantageous feature of the invention, the unlocking element can be mechanically brought into engagement with the locking element of the locking device by the relative movement of the first structural component relative to the second structural component. The locking device is therefore unlocked by the relative movement of the first structural component relative to the second structural component. As a result of the relative movement between the first and second structural components of the motor vehicle seat, the unlocking element is mechanically brought into engagement with the locking element of the locking device.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is an exploded view of an exemplary embodiment of a locking device according to the invention for a motor vehicle seat;

FIG. 4a is a perspective view of the locking device in the use position;

FIG. 5 is a perspective view of the motor vehicle seat, depicting the locking device in the easy-entry position; and FIG. 5a is a perspective view of the locking device in the easy-entry position.

DETAILED DESCRIPTION OF PREFERRED EMBODIMENTS

Figure 2:
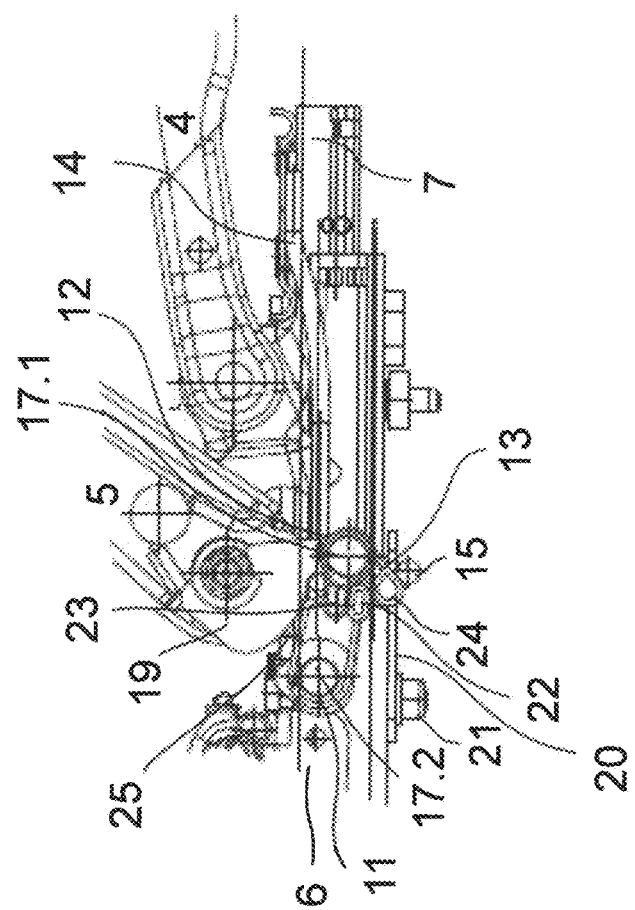
FIGS. 2a-2f are partial side views of the locking device during adjustment of the motor vehicle seat from a use position to an easy-entry position.
Figure 2:
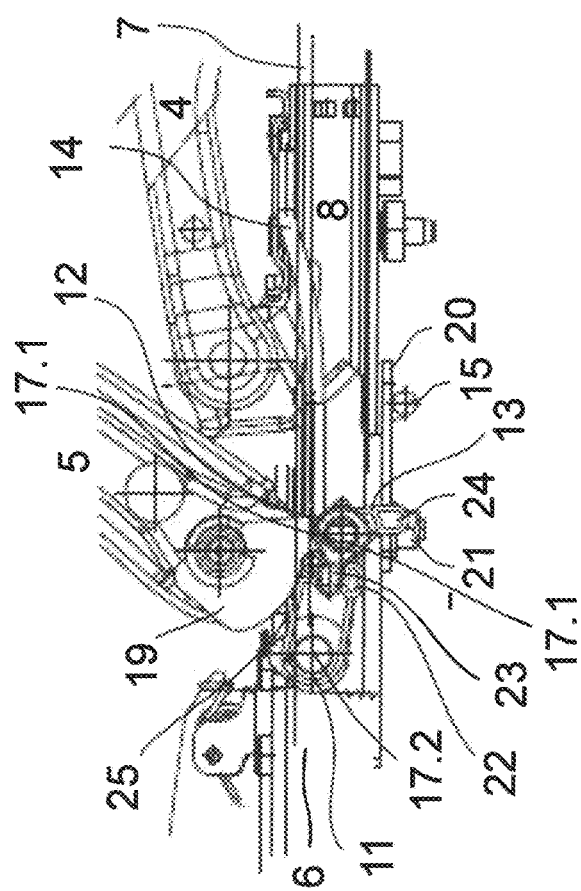
Figure 2E:
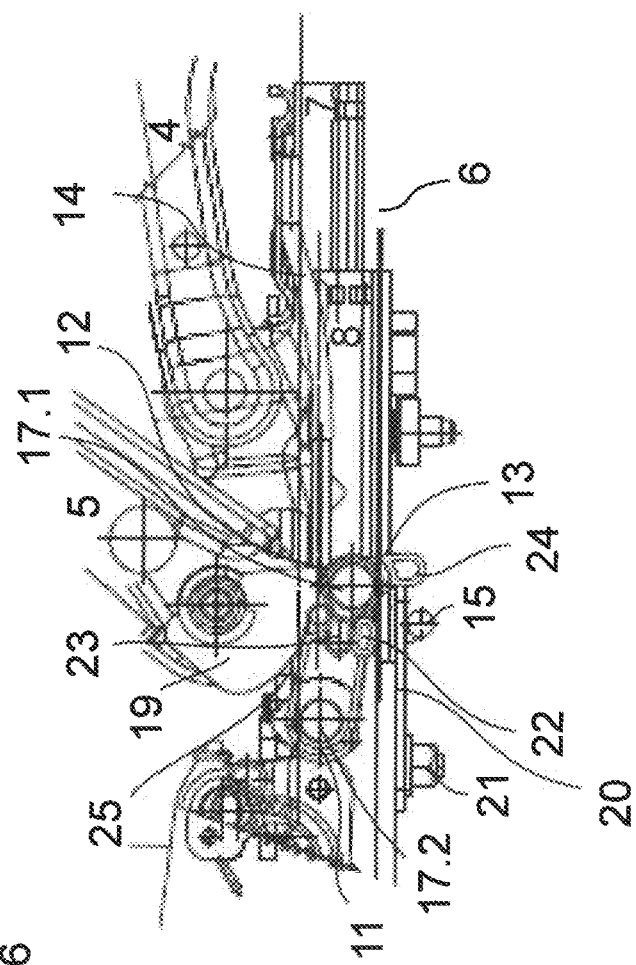

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an exploded view of an exemplary embodiment of a locking device according to the invention, generally designated by reference numeral 10 for a motor vehicle seat, generally designated by reference numeral 1. The motor vehicle seat is shown in greater detail in FIGS. 4 and 5 and includes a backrest 2, a seat cushion 3, and a longitudinal seat adjuster 8. The longitudinal seat adjuster 6 includes an upper rail 7 and a lower rail 8. The lower rail 8 is arranged fixed to the floor of the interior of the motor vehicle (not shown). To adjust the motor vehicle seat 1 in a longitudinal direction, the upper rail 7 of the longitudinal seat adjuster 6 slides in the lower rail 8. The motor vehicle seat 1 further includes a guide rocker 5 that is arranged pivotably on the upper rail 7 and is also pivotably connected to the backrest 2. A rocker 4 supports the seat cushion 3 in its front region and is pivotably connected to the seat cushion 3 and the upper rail 7.

Referring back to FIG. 1, the locking device 10 has a hook 19 on which a blocker 11 and a deblocker 12 are rotatably fastened by a rivet 17.1 and a corresponding washer 18.1 such that a nose 22 of the blocker 11 engages with a nose 23 of the deblocker 12. The deblocker 12 is pretensioned by a spring 16.1. The locking device 10 further includes a locking element 13 which is rotatably fastened to the hook 19 by a rivet 17.1 and washer 181 and pretensioned by a spring 16.1. The locking element 13 has a nose 24. Additional components of the locking device 10 are a retaining element 14 that is attached to the motor vehicle seat 1 for engagement in a groove 25 in the hook 19, as well as an unlocking element 15 that is fastened, preferably welded, to a fastening element 20 which is mounted to the motor vehicle seat 1 by a screw and nut assembly 21.

To transition the motor vehicle seat 1 from a use position to an easy-entry position, the motor vehicle seat 1 is moved manually by a user such that the backrest 2 is pivoted forward and the seat cushion 3 is also forced to pivot. In addition, the motor vehicle seat 1 slides forward on the longitudinal seat adjuster 6. Backrest 2, seat cushion 3, and the lower rail 8 of the longitudinal seat adjuster 6 therefore perform a relative movement.

Figure 2F:
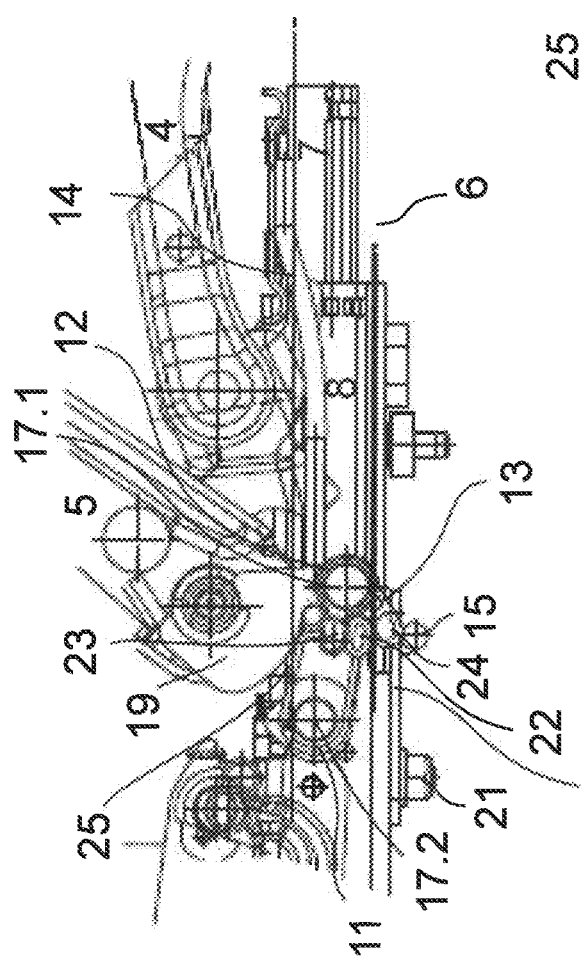

Turning now to FIGS. 2a to 2f, there are shown partial side views of the locking device 10 during adjustment of the motor vehicle seat 1 from the use position, depicted in FIG. 2a, to the easy-entry position, depicted in FIG. 2f. In the following description, it is to be understood that a reference to a direction relates to a direction facing forward in the motor vehicle. The backrest 2 is therefore arranged at a rear end of the seat cushion 3.

Currently preferred is an arrangement of only one locking device 10 on one side of the motor vehicle seat 1 in order to adjust the motor vehicle seat 1 from the use position to the easy-entry position, and vice versa. It is also possible to arrange a locking device 10 on each side of the motor vehicle seat 1, e.g., for redundancy reasons, with both locking devices installed symmetrically and mirror images of one another.

In the non-limiting example of FIGS. 2a-2f, the locking device 10 is arranged on the right side of the motor vehicle seat 1. The hook 19 is rigidly connected to the guide rocker 5. The blocker 11 and the deblocker 12 are fastened rotatably in relation to each other to the hook 19 by the rivet 17.1 such that the noses 22, 23 have an angle of approx. 120°. The nose 22 of the blocker 11 additionally engages with the nose 24 of the locking element 13, which is fastened to the hook 19 by the rivet 17.1. The retaining element 14 is rigidly connected to the upper rail 7. The unlocking element 15 is fastened to the lower rail 8 in perpendicular relation to the longitudinal direction of the motor vehicle seat 1 by the screw and nut assembly 21.

To transition the motor vehicle seat 1 from the use position (FIG. 2a) to the easy-entry position (FIG. 2f), a user exerts force on the backrest 2 such that the backrest 2 is pivoted forward. The angle between the backrest 2 and the seat cushion 3 always remains the same during the entire process. Due to the pivoting movement of the backrest 2, the guide rocker 5 is also pivoted forward, causing the hook 19 to be guided downward at the same time, as shown in FIG. 2b, until the backrest 2 reaches a maximum extension, shown in FIG. 2c. Simultaneously with the pivoting movement of the backrest 2, the motor vehicle seat 1 is moved forward as the upper rail 7 slides on the lower rail 8. As a result of this longitudinal movement, the retaining element 14, which is rigidly connected to the upper rail 7, slides into the groove 25 of the hook 19. With the forward movement of the upper rail 7, the nose 23 of the deblocker 12 strikes the unlocking element 15, which is fastened to the lower rail 8. This is shown in FIG. 2d. In this position, the retaining element 14 is located maximally in the groove 25 of the hook 19. With further longitudinal movement of the motor vehicle seat 1 (FIG. 2e), the groove 25 in the hook 19 slides further over the unlocking element 15 in order to, in the easy-entry position (FIG. 2f), reach the starting position again due to the pretensioning of the deblocker 12 by the spring 16.1. In this position, the retaining element 14 is located in the groove 25 of the hook 19, blocked by the locking element 13, and blocks a pivoting movement of the backrest 2 and therefore of the motor vehicle seat 1.

In addition, the motor vehicle seat 1 can be transitioned into a so-called floor position, in which the rear side of the backrest 2 is oriented basically horizontally. The floor position of the motor vehicle seat 1 is advantageous in particular when the motor vehicle seat 1 is arranged in the second row of seats. The floor position then enables a basically flat cargo area.

Figure 3:
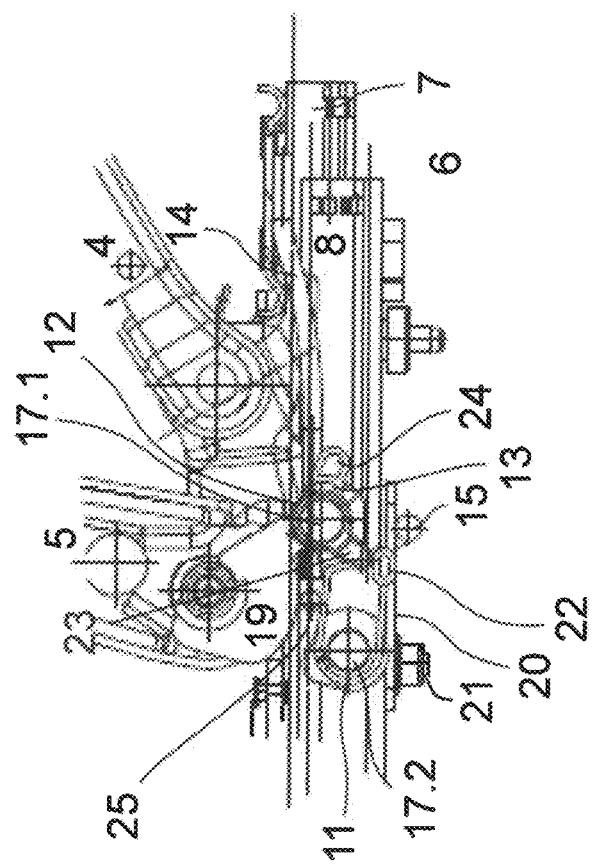
FIGS. 3a-3f are partial side views of the locking device during adjustment of the motor vehicle seat from the easy-entry position to the use position.
Figure 3:
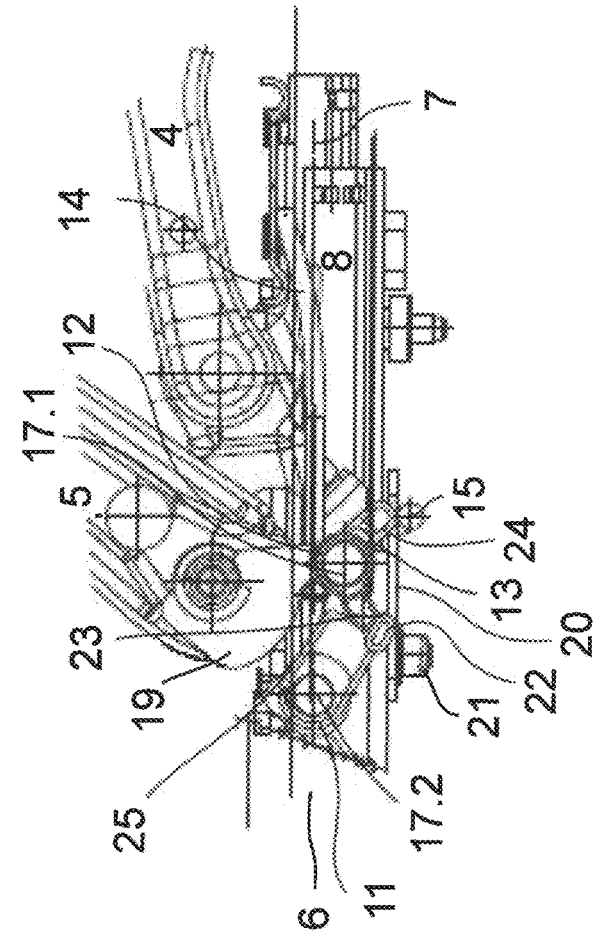

FIGS. 3a-3f show partial side views of the locking device 10 during adjustment of the motor vehicle seat 1 from the easy-entry position (FIG. 3a) to the use position (FIG. 3f). The adjustment to the use position from the easy-entry position is basically realized in a reverse order as the adjustment to the easy-entry position, as described above with respect to FIGS. 2a to 2f. To transition the motor vehicle seat 1 from the easy-entry position, a user exerts force on the backrest 2 such that the motor vehicle seat 1 slides backward in the upper rail 8 (FIG. 3a). The retaining element 14 is positioned in the groove 25 of the hook 19 and prevents the backrest 2 and the seat cushion 3 from tilting backwards. With further longitudinal movement of the motor vehicle seat 1 (FIGS. 3b, 3c), the groove 25 of the hook 19 slides further over the unlocking element 15. The nose 22 in the blocker 11 presses hereby against the nose 24 of the locking element 13 and pivots the blocker 11 far enough downwards to release the retaining element 14. The retaining element 14 is moved backwards by the sliding movement of the upper rail 7 to the rear and slides past the blocker 11, which is guided downward by the pivoting movement of the backrest 2. This is shown in FIG. 3d. With further movement of the motor vehicle seat 1 backwards during the simultaneous pivoting movement of the backrest 2 and the guide rocker 4 (FIG. 3e), the blocker 11 is moved into the starting position again by the pretensioning applied by the spring 16.2. With a further movement of the motor vehicle seat 1 backwards during simultaneous pivoting movement of the backrest 2, the use position (FIG. 3f) is reached.

Figure 4:
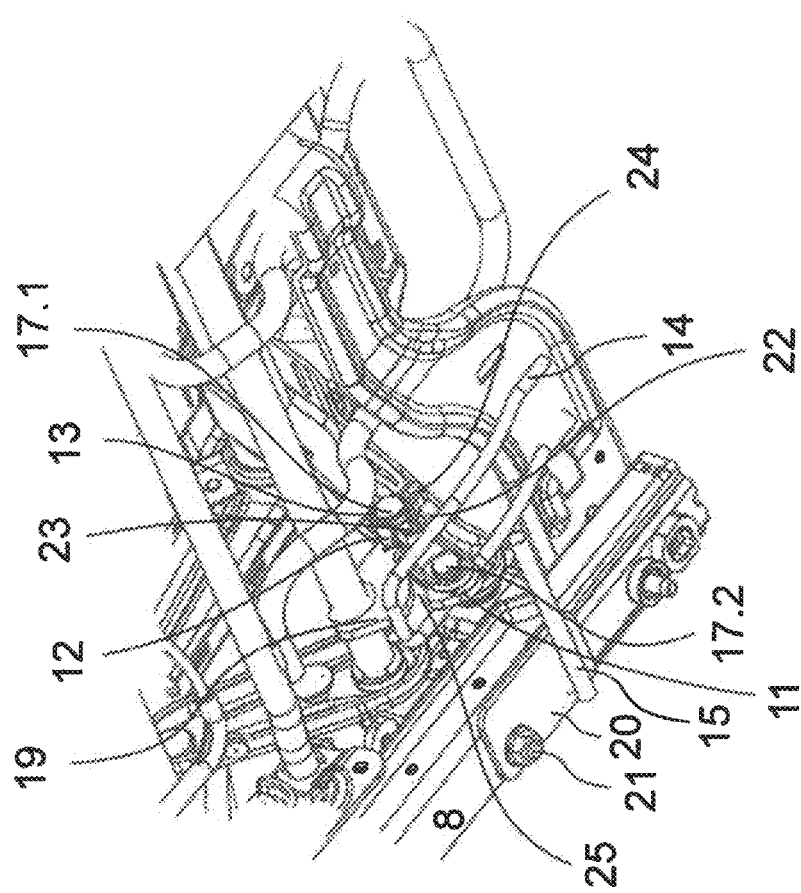
FIG. 4 is a perspective view of the motor vehicle seat, depicting the locking device in the use position.
Figure 4:
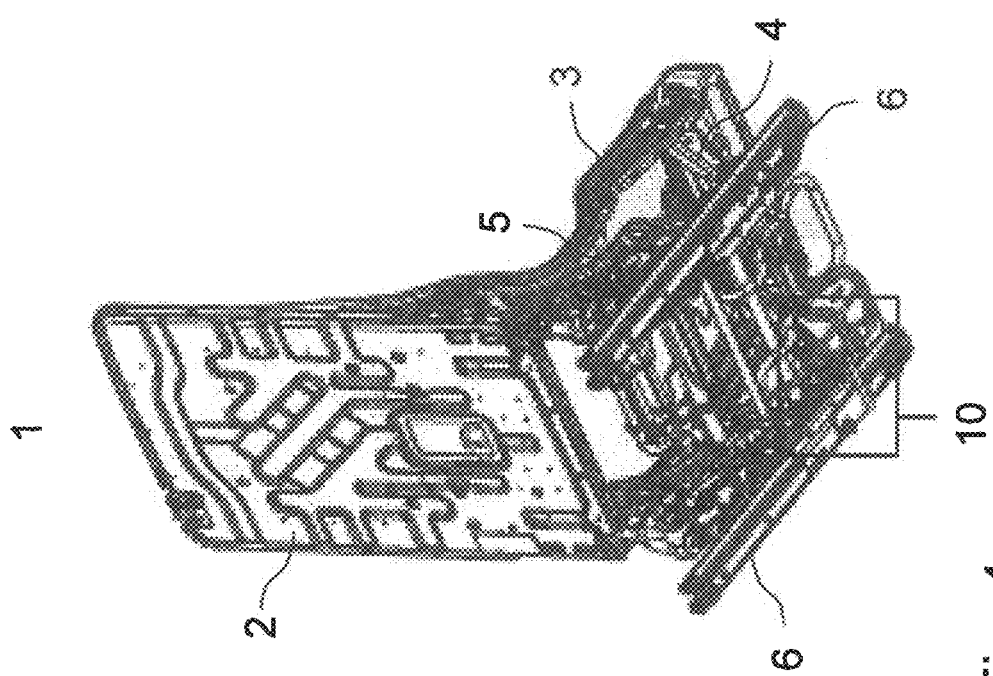

Turning again to FIG. 4, it is readily apparent that the locking device 10 is arranged on the underside of the motor vehicle seat 1. FIG. 4a shows the use position of the locking device 10. In the use position, the backrest 2 of the motor vehicle seat 1 is not tilted, so that the hook 19 assumes the maximally lifted position and the locking element 13 is not positioned in the groove 25 of the hook 19. The motor vehicle seat 1 can thus be adjusted via the longitudinal seat adjuster 6.

FIGS. 5 and 5a show the locking device 10 assuming the easy-entry position, in which the backrest 2 of the motor vehicle seat 1 is maximally pivoted and the locking element 13 is locked in the groove 25 of the hook 19 by the blocker 11. A tilting of the guide rocker 5 and the backrest 2 coupled to the guide rocker 5 is not possible due to the location of the locking element 13 in the groove 25.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A motor vehicle seat for a motor vehicle, said motor vehicle seat adjustable from an entry position to a use position or vice versa, and comprising:

a lower rail attached in a fixed position to an interior floor of the motor vehicle, an upper rail slideable in the lower rail, a retaining element rigidly connected with the upper rail, a guide rocker arranged pivotably on the upper rail and to pivotably connected to a backrest of the motor vehicle seat, a locking device comprising an unlocking element fastened to the lower rail, a hook having a groove configured for engagement with the retaining element, a locking element rotatable fastened to the hook, a blocker and a deblocker pivotally connected to the hook for engagement of a nose of the blocker with a corresponding nose of the deblocker, with the nose of the blocker being configured to engage with a nose of the locking element, wherein during move of the motor vehicle seat from the use position to the entry position, the groove of the hook engages with the retaining element upon a forward moment of the motor vehicle seat and the nose of the deblocker strikes the unlocking element, with the locking element thereby blocking the retaining element in the groove of the hook and hence blocking pivoting of the backrest and of the motor vehicle seat, and wherein during move of the motor vehicle seat from the entry position to the use position, the groove of the hook slides over the unlocking element, the nose of the blocker presses against the nose of the locking element and releases the retaining element, and the blocker return to an initial position, allowing the backrest and of the motor vehicle seat to attain the use position.

2. The motor vehicle seat of claim 1, wherein the motor vehicle seat is constructed to transition manually between the entry position and the use position.

3. The motor vehicle seat of claim 1, wherein the locking device is unlocked by moving the upper rail relative to the lower rail.

4. The motor vehicle seat of claim 1, further comprising a spring disposed between the locking element and the hook and operating to pretension the locking element against the hook.

5. A method for adjusting a motor vehicle seat from an entry position to a use position or vice versa, the motor vehicle seat comprising a lower rail attached in a fixed position to an interior floor of the motor vehicle, an upper rail slideable in the lower rail, a retaining element rigidly connected with the upper rail, a guide rocker arranged pivotably on the upper rail and to pivotably connected to a backrest of the motor vehicle seat, and a locking device comprising an unlocking element fastened to the lower rail, a hook having a groove configured for engagement with the retaining element, a locking element rotatable fastened to the hook, a blocker and a deblocker pivotally connected to the hook for engagement of a nose of the blocker with a corresponding nose of the deblocker, with the nose of the blocker being configured to engage with a nose of the locking element, said method comprising:

allowing the lower rail, the upper rail and the guide rocker to move relative to each other during adjustment from use position to the entry position by engaging the groove of the hook with the retaining element upon a forward moment of the motor vehicle seat and striking the unlocking element with the nose of the deblocker, blocking with the locking element the retaining element in the groove of the hook and hence blocking pivoting of the backrest and of the motor vehicle seat;

allowing the lower rail, the upper rail and the guide rocker to move relative to each other during adjustment from the entry position to the use position by sliding the groove of the hook over the unlocking element, pressing the nose of the blocker against the nose of the locking element and releasing the retaining element, and returning the blocker to an initial position, allowing the backrest and of the motor vehicle seat to attain the use position.

6. The method of claim 5, further comprising unlocking the locking device by moving the upper rail relative to the lower rail by applying a force in a longitudinal direction of the upper rail, without requiring actuation of an additional operating element by a user.

* * * * *